Figure 3:
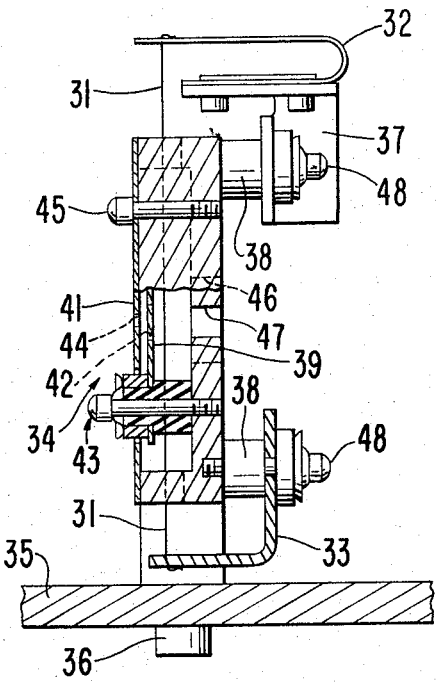

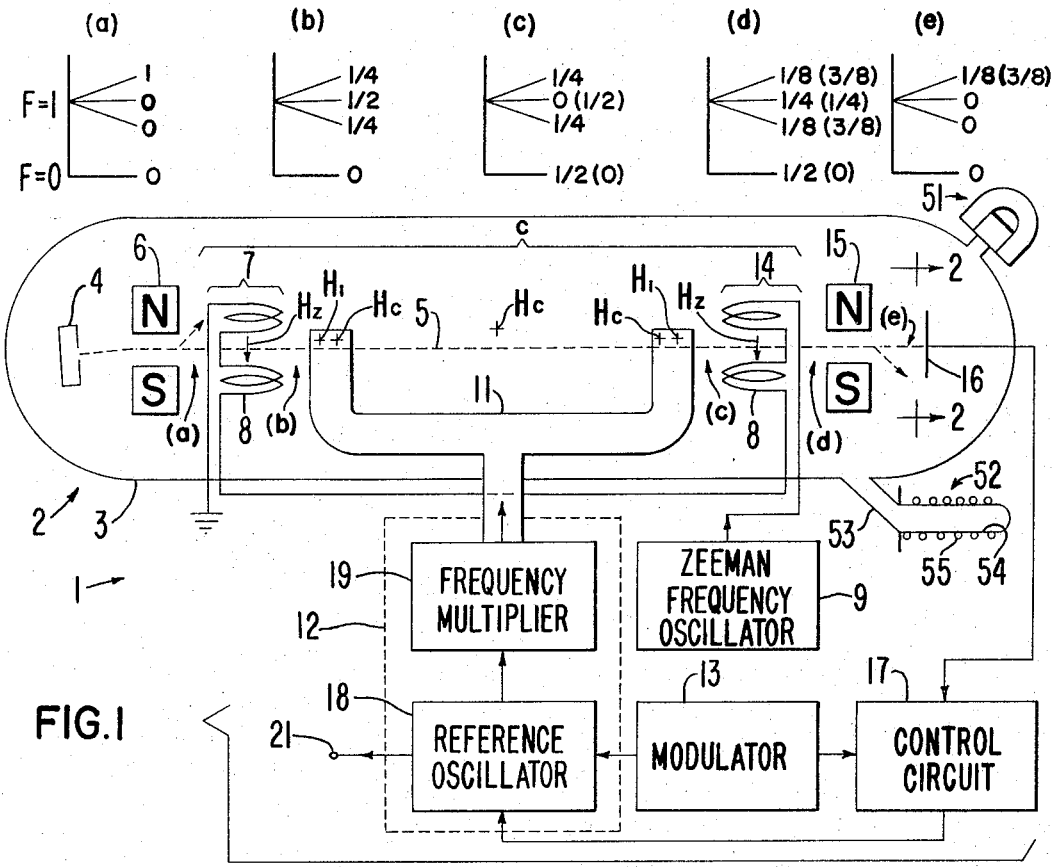
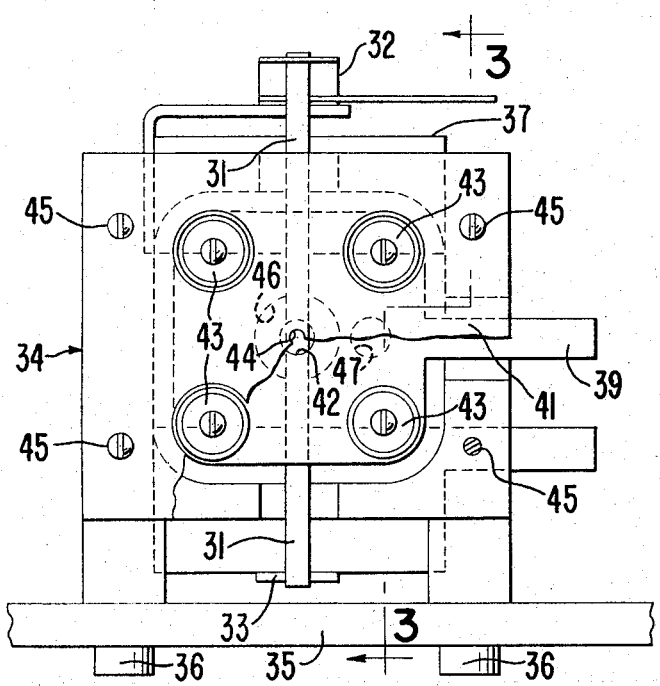

Dec. 26, 1967 R. F. LACEY 3,360,740
CRITICAL TEMPERATURE RANGE FOR OXYGENATED TUNGSTEN
IONIZING DETECTOR IN THALLIUM BEAM TUBES
Filed July 18, 1966 2 Sheets-Sheet 2

INVENTOR.
RICHARD F. LACEY
BY Wm. J. Nolan
ATTORNEY

United States Patent Office 3,360,740
Patented Dec. 26, 1967

3,360,740
CRITICAL TEMPERATURE RANGE FOR OXYGENATED TUNGSTEN IONIZING DETECTOR IN THALLIUM BEAM TUBES
Richard F. Lacey, Essex, Mass., assignor, by mesne assignments, to Hewlett-Packard Company, Palo Alto, Calif., a corporation of California
Filed July 18, 1966, Ser. No. 565,792
7 Claims. (Cl. 331—3)

The present invention relates in general to improved detectors for thallium beam tubes and, more particularly to an oxygenated tungsten ionizing detector of thallium beam atoms wherein the tungsten ionizing element is operated within a temperature range of 1200° K. to 1250° K., whereby efficient ionization of thallium beam atoms is obtained and efficient modulation of the ionized beam intensity is obtained at frequencies up to on the order of 10 Hz. The detector of the present invention is especially useful for, but not limited to use as, the atomic beam detector of a thallium atomic beam tube forming a portion of a frequency standard or atomic clock.

Theretofore, thallium atomic beam tubes have been built. In these prior tubes, oxygenated tungsten ionizing detectors have been employed for ionizing the thallium atoms of the beam which strike the hot tungsten detector. The ions, thus produced, are then accelerated into an electron multiplier for amplification of the ion current. In these prior systems, the tungsten detector was operated under conditions of oxygen pressure and operating temperature which rendered these prior detectors impractical for a sealed off thallium beam tube useful as the frequency reference of a frequency standard or atomic clock system. In these prior systems, the temperature of the oxygenated tungsten detector was either so high that very low ionization efficiency was obtained or so low that the sticking time for the incident thallium atoms was so long as to preclude efficient intensity modulation of the ionized beam at reasonable frequencies for automatic control such as on the order of 10 Hz. or higher.

In the present invention, it has been discovered that there is an optimum temperature range of from 1200° K. to 1250° K. for the oxygenated tungsten detector such that efficient ionization of thallium atoms is obtained and sticking times are sufficiently short such as to permit modulation of the thallium beam at frequencies on the order of 10 Hz. A sealed off thallium atomic beam tube using an oxygenated tungsten ionizing detector operating within the aforementioned temperature range is especially useful as the reference frequency source of a frequency standard or atomic clock.

The principal object of the present invention is the provision of an improved thallium beam tube and frequency standard or atomic clock system using same.

One feature of the present invention is the provision of a thallium beam ionizing detector formed by an oxygenated tungsten element operating within the temperature range of 1200° K. to 1250° K., whereby its ionizing efficiency is relatively high and the sticking time of the thallium atoms is sufficiently short such as to permit efficient modulation of the thallium beam, as detected, at frequencies on the order of 10 Hz.

Another feature of the present invention is the same as the preceding feature wherein the ionizing detector is incorporated within an evacuated thallium beam tube and wherein the oxygen for the oxygenated tungsten element is replenished from the atmosphere within the beam tube and wherein said atmosphere includes a partial pressure of oxygen falling within the range of $5 \times 10^{-7}$ to $5 \times 10^{-9}$ torr, whereby efficient use of thallium beam material is obtained for a thallium beam tube.

Another feature of the present invention is the same as any one or more of the preceding features wherein oxygen is supplied to the oxygenated tungsten element from the earth's atmosphere by diffusion through a heated silver member, whereby a convenient source of oxygen is provided for the oxygenated tungsten element.

Another feature of the present invention is the same as any one or more of the preceding features wherein the thallium beam detector forms a portion of a frequency standard or atomic clock system wherein the atomic beam is intensity modulated to derive an error signal in a frequency control channel of the system, whereby an improved system is obtained.

Figure 5:
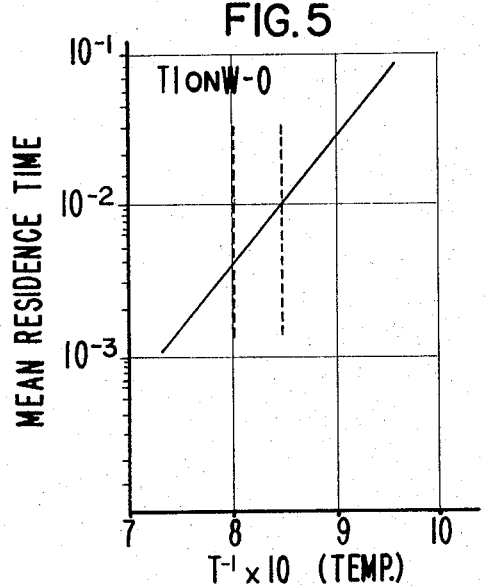
Figure 4:
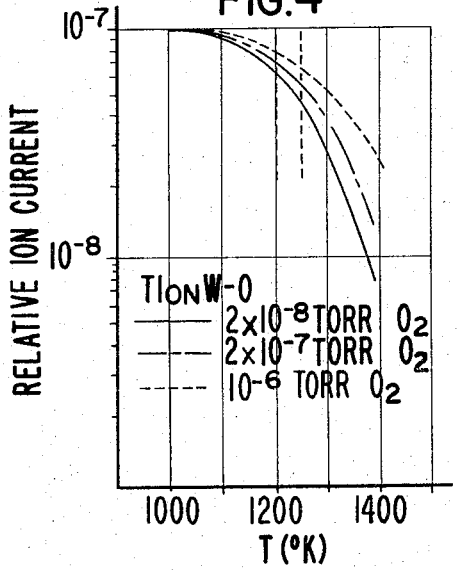

Other features and advantages of the present invention will become apparent upon a perusal of the following specification taken in connection with the accompanying drawings wherein:

FIG. 1 is a schematic line diagram of a thallium beam tube employing features of the present invention, and also depicting the energy level diagrams representative of populated energy states at successive positions along the beam path, FIG. 2 is an enlarged sectional view of the detector structure of FIG. 1 taken along line 2—2 in the direction of the arrows, FIG. 3 is a sectional view of the structure of FIG. 2 taken along line 3—3 in the direction of the arrows, FIG. 4 is a log plot of relative ion current versus ionizing detector element temperature for the thallium detector of FIGS. 2 and 3, and FIG. 5 is a log plot of mean residence or sticking time for thallium atoms versus reciprocal temperature of the ionizing tungsten detector of FIGS. 2 and 3.

Referring now to FIG. 1 there is shown a thallium beam tube frequency standard 1 incorporating features of the present invention. The standard 1 includes a thallium beam tube 2 having an enclosing elongated vacuum envelope 3. An oven beam source 4 is disposed at one end of the tube 2. The oven 4 projects a beam of thallium atoms into a beam path 5. The beam upon leaving the oven 4 has atoms populating both the ground state and the sublevels of the first upper hyperfine energy state. A hexapole state selecting magnet 6 is disposed to receive the beam and to deflect toward the axis of the beam atoms in the upper magnetic field dependent hyperfine energy level ($F=1$, $m=1$) as shown in diagram $(a)$. These atoms are deflected from a position off axis of the magnet to a trajectory which is parallel to the axis of the beam 5. Other levels are either not substantially deflected, or are deflected out of the beam. Undeflected atoms are stopped by stops, i.e., metal disks, not shown, which are disposed on the longitudinal axis either at the entrance or exit port of the hexapole state selector magnet 6. In the energy level diagram $(a)-(e)$, the numerals at the ends of the energy level lines (0, 1, ¼, ⅛, ⅜ etc.) indicate their relative population densities at the similarly letter labeled positions along the beam path.

The beam then enters a Zeeman resonance region 7 for redistributing the populations of the upper hyperfine energy levels. More particularly, an audio frequency magnetic field $H_2$ at the Zeeman resonance frequency is applied to the beam in the presence of a transverse C-field as of 30 to 60 milligauss produced by a conventional U-shaped C-field magnet, not shown, to produce a 90° Zeeman resonance precession of the ($F=1$, $m=+1$) level atoms. This produces a redistribution of the population densities of the ($F=1$, $m=0$) ($F=1$, $m=+1$) and ($F=1$, $m=-1$) energy levels as shown by energy diagram $(b)$. One important thing to note is that the magnetic field independent energy level ($F=1$, $m=0$) has been populated. The 90° precession is produced by applying an alternating magnetic field $H_2$ at right angles to the C-field and at the Zeeman resonance frequency which for thallium is 1.4/3 MHz./gauss. At a C-field intensity of, for example, 60 milligauss the applied signal is about 28 KHz. The alternating field is applied via an audio frequency coil 8 with its axis oriented at right angles to the C-field and excited by current supplied from an oscillator 9 at the Zeeman resonance frequency. The intensity of the applied alternating magnetic field $H_2$ is selected such that in the time of flight of a thallium atom through the alternating magnetic field $H_2$ of the Zeeman resonance region the magnetic moment of the hyperfine atom will be rotated (precessed) by 90°.

The beam then passes through a conventional split field C-field cavity resonator structure 11 excited at the field independent hyperfine resonance frequency for the $(F=1, m=0)$ to $(F=0, m=0)$ transition at 21.3108333946 GHz. The microwave energy for exciting the transition is supplied to the cavity from a microwave generator 12. When the applied microwave magnetic field $H_1$, which is applied parallel to the C-field, is at precisely the field independent hyperfine frequency, a transition in the beam is obtained and the energy levels are populated as shown by diagram (c). The microwave frequency from the generator 12 is modulated through resonance by modulator 13 to cause the population densities of the beam to represent alternatively those of resonance and those without resonance, as indicated by the numerals in parenthesis in the energy level diagrams. Thus, the field independent level $(F=1, m=0)$ is alternatively populated and depopulated at some convenient frequency such as 10 Hz.

The beam then passes through a second Zeeman resonance region 14 substantially identical to region 7 described previously, to redistribute the populations of the energy levels as indicated by energy level diagram labeled (d). The distribution in parenthesis is without hyperfine resonance in the C-field cavity 11. The beam population shifts between one population condition and the other at the modulation frequency of the modulator 13.

The beam then passes into a second hexapole state selective magnet assembly 15, substantially identical to the first state selective magnet 6. The second state selective magnet 15 serves to deflect out of the beam certain atoms not in the upper Zeeman sublevel $(F=1, m=+1)$ and to cause certain others not to be deflected and thus stopped by the stops described previously with regard to magnet 6. The atoms focused into the beam pass on to a detector 16, more fully described below, to produce an output signal. The atoms of the beam passing on to the detector 16 populate the upper Zeeman sublevel as shown by the energy level diagram labeled (e). It is seen that with hyperfine resonance in the C-field region that a maximum of ⅛ of the original beam atoms which passed through the first state selecting magnet 6 reach the detector 16, whereas without resonance ⅜ of such original atoms reach the detector 16. Thus there is produced an output resonance signal at the modulation frequency which is fed to a control circuit 17 wherein it is phase sensitively detected to give an error signal for controlling the frequency of a reference oscillator 18 at some convenient low frequency such as 5 MHz. and forming a part of the microwave generator 12. One output of the low frequency reference oscillator 18 is fed through a suitable frequency multiplier 19 to supply the microwave signal to the C-field cavity resonator 11. Another output of the phase locked reference oscillator 18 is taken out at terminal 21 to provide the output of the frequency standard 1.

Referring now to FIGS. 2 and 3 there is shown the improved oxygenated tungsten thallium ionizing detector of the present invention. The ionizing detecting element is a tungsten ribbon 31, as of 0.002" thickness, 0.080" width and 1.5" long. The ribbon is placed on the beam path 5 to intercept thallium atoms of the beam. The upper end of the ribbon 31 is held in tension by a steel leaf spring 32. The lower end of the ribbon 31 is fixedly held by a conductive stainless steel bracket 33. The ribbon 31 passes through a hollow detector housing assembly 34 as of stainless steel. The housing 34 is mounted to a longitudinal support channel 35 by screws 36. The lower ribbon support bracket 33 and the upper support spring 32 together with a supporting bracket 37, as of stainless steel, are each mounted to the back side of the detector housing assembly 34 via a pair of electrical insulator assemblies 38.

A pair of screen or grid electrodes 39 and 41 are positioned upstream of the ionizing ribbon 31 for accelerating positively ionized thallium atoms away from the detector ribbon 31 and through a conventional deflecting mass spectrometer portion and into an electron multiplier portion, not shown, of the beam detector assembly 16. The innermost grid electrode 39 is a paddle shaped tantalum plate as of 0.010" thick and operated at the same potential, as of +16 v., as the ribbon detector 31 and includes a central aperture 42, as of 0.100" diameter in axial alignment with the thallium beam path 5. The inner grid 39 is axially spaced from the ribbon 31, as by 0.0225", and mounted on four insulator assemblies 43 from the back wall of the detector housing assembly 34. The outer grid electrode 41, as of 0.010" thick tantalum sheet stock, includes a central aperture 44, as of 0.045" diameter, in axial alignment with the beam path 5. The outer grid 41 is held to the detector housing 34 via screws 45 and is operated at the same potential as the detector housing 34, which is ground potential. The outer grid 41 is spaced from the inner grid 39 as by 0.0225". The back wall of the detector housing assembly 34 includes a pair of holes 46 and 47 as of 0.250" and 0.125" in diameter, respectively, to provide a pair of gas access passageways communicating between the interior of the detector housing 34 and the reduced atmosphere inside the vacuum envelope 3.

Heating current and the operating potential for the tungsten ribbon 31 are applied to the ribbon 31 across terminals 48 of the insulator assemblies 38. The current flow through the tungsten ribbon 31 directly heats the ribbon to its operating temperature. The current is controlled to maintain the temperature of the ribbon within the range of 1200° K. to 1250° K. for reasons more fully described below.

The vacuum envelope 3 includes an appendate getter-ion vacuum pump 51 having a pumping speed of 0.2 to 8 liters per second for pumping the envelope 3 to a suitable operating pressure as of $10^{-9}$ to $10^{-7}$ torr. An oxygen leak source 52 admits oxygen into the envelope 3 from the surrounding earth's atmosphere to maintain an atmosphere inside the envelope having a partial pressure of oxygen from $5 \times 10^{-7}$ to $5 \times 10^{-9}$ torr.

The oxygen leak source 52 includes a tubulation 53 as of 1/16" I.D. copper which connects into the vacuum envelope 3 of the tube 2. A silver metal tube 54 which is closed at its outer end is sealed at its inner end to the tubulation 53. The silver tube 54, as of 4" in length and ⅛" I.D. and 3/16" O.D., forms a partition between the inside of the vacuum envelope 3 and the outside earth's atmosphere. An insulated heater wire 55 is wound over the silver tube 54 for heating same to a temperature of about 500° C. At this temperature, oxygen from the earth's atmosphere diffuses through the silver tube 54 into the vacuum envelope 3. The temperature of the tube 54 is controlled to maintain the partial pressure of oxygen within the envelope 3 within the range of $5 \times 10^{-9}$ to $5 \times 10^{-7}$ torr.

The ionizing ribbon 31 will only ionize thallium atoms if the work function of the tungsten surface which receives the thallium atoms incident thereon is greater than 6.1 e.v., the ionizing potential of thallium. The typical work function for a clean polycrystalline tungsten surface is 4.5 e.v. However, in the presence of sufficient oxygen in the atmosphere surrounding the tungsten surface it becomes coated with oxygen atoms. An oxygenated tungsten surface, i.e., oxygen adsorbed on the tungsten surface, has a work function greater than 6.0 e.v. and thus is suitable for ionizing thallium. The oxygen is completely desorbed if the partial pressure of oxygen in the internal atmosphere is reduced below $10^{-9}$ torr. for a time greater than one hour. Some oxygen is continuously being desorbed. This desorbed oxygen must be replenished in order to sustain operation of the ionizing detector. It has been found that a partial pressure of $5 \times 10^{-9}$ to $5 \times 10^{-7}$ is sufficient to replenish the desorbed oxygen while not excessively increasing the background noise of the detector 16.

Referring now to FIG. 4 there is shown a plot of relative thallium ion current as a function of tungsten ionizer temperature for various oxygen pressures. It is seen that for temperatures much above 1250° K. that the efficiency of the ionizer falls off at a substantial rate and that for temperatures below 1250° K. the efficiency is relatively high and tends to level off.

Referring now to FIG. 5 there is shown a plot of mean residence time (sticking time) of thallium ions on oxidized tungsten as a function of reciprocal temperature. In order to efficiently retain intensity modulation of the thallium beam through the ionization process of the detector 16 the mean residence time should be less than $\frac{1}{10}$ the time required for one cycle of the modulation. Thus, in order to efficiently retain a 10 Hz. modulation the mean residence time should be less than $10^{-2}$ seconds at modulation frequencies substantially less than 10 Hz. the circuit complexity of the detector apparatus for a given signal to noise ratio is substantially increased. From the plot of FIG. 5 this means the temperature T should be greater than 1190° K. Thus, for efficient ionization the temperature of the ionizer should be less than 1250° K. and for efficient modulation, at around 10 Hz. or higher, the temperature should be greater than 1200° K. Thus, the optimum operating temperature of the oxygenated tungsten ionizer ribbon, in the region upon which the thallium atoms are ionized, falls within the range of 1200° K. to 1250° K. when the tube 2 is employed as a practical frequency reference in a frequency standard or atomic clock system which employs modulation in the frequency control loop of on the order of 10 Hz.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An oxygenated tungsten thallium ionizer apparatus including: means defining an evacuated envelope; means for producing a beam of thallium atoms within said envelope; means disposed in the beam path for ionizing thallium atoms of the beam incident thereon; said ionizing means including, a tungsten element, means forming a coating of oxygen atoms on a surface of said ionizer element against which the thallium atoms impinge for ionization, and means for heating the ionizing surface of said tungsten element to and operating same at a temperature within the range of 1200° K. to 1250° K., whereby the ionization efficiency of said ionizing element is on the order of 80% and whereby the mean sticking time of the thallium atoms is on the order of $10^{-2}$ seconds thereby permitting intensity modulation of the incident beam to be efficienctly carried over as intensity modulation of the ionized beam at frequencies on the order of 10 Hz.

2. The apparatus of claim 1 wherein said evacuated envelope contains an atmosphere of oxygen at a partial pressure of $5 \times 10^{-9}$ to $5 \times 10^{-7}$ torr., whereby the oxygen coating on said tungsten element is replenished from said atmosphere.

3. The apparatus of claim 2 including, means forming a source of oxygen for supplying oxygen to said evacuated envelope, said oxygen source including means forming a silver metal partition between the inside of said envelope and the earth's atmosphere outside of said envelope, and means for heating said silver partition to an elevated temperature above 350° C. to cause oxygen from the earth's atmosphere to diffuse through said silver partition into the evacuated envelope to maintain the oxygen pressure within said envelope, whereby a convenient source of oxygen is provided.

4. The apparatus of claim 2 including in combination, means disposed along the thallium beam intermediate said beam forming means and said beam detecting means for applying an alternating magnetic field to the beam at the hyperfine resonance frequency to excite hyperfine gyromagnetic resonance of the thallium atoms of the beam, and means disposed along the thallium beam between said alternating magnetic field applying means and said beam detecting means for focusing into said detector means a certain fraction of the thallium beam atoms in variable accordance with whether the beam atoms were excited into hyperfine resonance by the applied alternating field, whereby the thallium atoms ionized by said detector means represent an ion current forming a resonance output signal which is variable in accordance with hyperfine resonance of the beam.

5. The apparatus of claim 4 including means for modulating the frequency of the applied alternating magnetic field to modulate the ion current of the detected beam and thus the resonance output signal, and means for comparing the modulation of the applied alternating magnetic field with the modulation of the output resonance signal to derive an error signal for controlling the frequency of the applied alternating magnetic field to sustain hyperfine resonance of the thallium beam.

6. The apparatus of claim 5 wherein the modulation frequency of the applied alternating magnetic field is greater than 5 Hz., whereby frequency control of the applied alternating magnetic field is more easily achieved than with lower frequency modulation.

7. The apparatus of claim 6 including, means forming a source of oxygen for supplying oxygen to said evacuated envelope, said oxygen source including means forming a silver metal partition between the inside of said envelope and the earth's atmosphere outside of said envelope, and means for heating said silver partition to an elevated temperature above 350° C. to cause oxygen from the earth's atmosphere to diffuse through said silver partition into said evacuated envelope to maintain the oxygen pressure within said envelope, whereby a convenient source of oxygen is provided.

No references cited.

JOHN KOMINSKI, *Primary Examiner.*